UNITED STATES PATENT OFFICE.

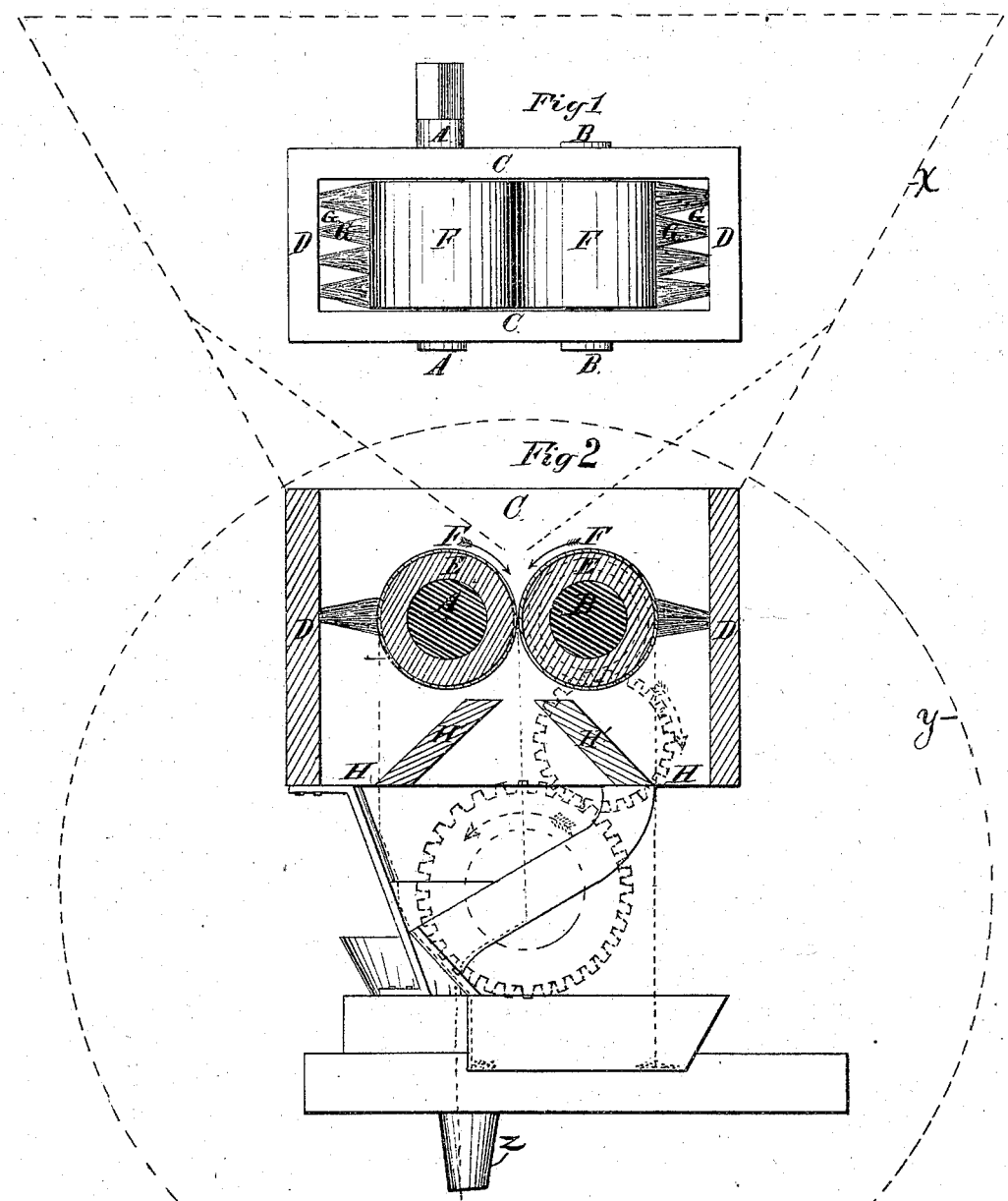

PARKINSON DODGE SHEPHERD, OF TELLFAIR, GEORGIA.

IMPROVEMENT IN COMBINED SEED-SEPARATORS AND DRILLS.

Specification forming part of Letters Patent No. 137,965, dated April 15, 1873; application filed April 12, 1872.

*To all whom it may concern:*

Be it known that I, P. DODGE SHEPHERD, late of Berryville, in the county of Clarke and in the State of Virginia, and now residing at Tellfair, Georgia, have invented certain new and useful Improvements in Seed-Hills; and do hereby declare that the following is a full, clear, and exact description thereof, reference being had to the accompanying drawing making a part of this specification, in which—

Figure 1 is a plan view of the upper side of my device, and Fig. 2 is a vertical longitudinal section of the same on the line $x$ $x$ of Fig. 1.

Letters of like name and kind refer to like parts in each of the figures.

The design of this invention is to thoroughly remove cockle-seed from wheat while the latter is passing through a drill or sower; and the invention consists in the combination, with the hopper and discharge-spouts of a grain-drill, of an attachment for removing cockle-seed, as will be described hereinafter.

In the drawing, Fig. 1 represents a top view of the attachment for removing the cockle-seed, and Fig. 2 a side elevation of the same, showing its relative position to the hopper and discharge-spouts of the drill.

A B represent shafts suitably journaled in the case or box C D, upon which are placed the rollers E E having the elastic covering F F. Motion is communicated to these rollers in any suitable manner, but preferably by means of gearing from the hub of one of the main supporting-wheels of the drill to the shaft A, motion being communicated to the other shaft by the friction of the rollers against each other. G G represent a series of brushes having their free ends suitably held against the rollers in such manner as to brush their entire surfaces as they revolve. H' H' represent chutes having between them a central opening, and at each side the discharge-openings H H, as shown. X represents in dotted lines the hopper of the grain-drill; Y, the driving-wheel, and Z the discharge-spouts.

The operation of my invention is as follows: The hopper having been filled, and motion having been given to the rollers, the grain is carried through between them by their revolution, and delivered through the central opening between the chutes H' H', more or less directly to the discharge-spouts. The cockle-seed, on the contrary, from its peculiar character, adheres to the elastic covering of the rollers, and is carried around by them until swept off by the brushes G G. By means of the described arrangement the grain is delivered through the central opening of the discharge-spouts, while the cockle-seed is delivered through the openings H H into boxes suitably prepared to receive it.

Having thus described my invention, what I claim as new, and desire to secure by Letters Patent, is—

The combination with the hopper and discharge-spouts of a grain-drill, of the cockle-seed attachment described, consisting essentially of the rollers, brushes, and chutes, arranged substantially as described, for the purpose set forth.

In testimony that I claim the foregoing I have hereunto set my hand this 13th day of April, 1870.

PARKINSON DODGE SHEPHERD.

Witnesses:
PHILIP H. POWERS,
GEORGE GLASS.